(12) United States Patent
Huang et al.

(10) Patent No.: US 8,553,971 B2
(45) Date of Patent: Oct. 8, 2013

(54) METHOD AND SYSTEM FOR MEASURING OBJECT

(75) Inventors: Kuo-Tang Huang, Hsinchu (TW); Bor-Tung Jiang, Hsinchu (TW); Shang-Chieh Lu, Hsinchu (TW); Po-Huang Shieh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 630 days.

(21) Appl. No.: 12/821,682

(22) Filed: Jun. 23, 2010

(65) Prior Publication Data
US 2011/0229013 A1    Sep. 22, 2011

(30) Foreign Application Priority Data

Mar. 18, 2010   (TW) .............................. 99107942 A (51) Int. Cl.
*G06K 9/00*    (2006.01)

(52) U.S. Cl.
USPC .............. 382/154; 382/104; 382/118; 348/46

(58) Field of Classification Search
USPC ........................... 382/154, 153, 104; 348/46
See application file for complete search history.

(56) References Cited

U.S. PATENT DOCUMENTS

| | | | |
|---|---|---|---|
| 6,198,852 B1 * | 3/2001 | Anandan et al. .............. | 382/284 |
| 6,442,293 B1 * | 8/2002 | Ito et al. ......................... | 382/154 |
| 6,744,435 B2 * | 6/2004 | Zwicker et al. ............... | 345/424 |
| 6,795,200 B1 | 9/2004 | Barman et al. | |
| 7,555,157 B2 * | 6/2009 | Davidson et al. ............. | 382/154 |
| 2002/0024593 A1 * | 2/2002 | Bouguet et al. ................. | 348/46 |
| 2002/0191839 A1 * | 12/2002 | Ito et al. ......................... | 382/154 |
| 2004/0218788 A1 * | 11/2004 | Geng ............................. | 382/118 |
| 2004/0264764 A1 * | 12/2004 | Kochi et al. ................... | 382/154 |
| 2006/0088203 A1 | 4/2006 | Boca et al. | |
| 2006/0115117 A1 * | 6/2006 | Nagaoka et al. .............. | 382/104 |
| 2007/0104353 A1 * | 5/2007 | Vogel ............................. | 382/106 |
| 2011/0043620 A1 * | 2/2011 | Svanholm et al. ............ | 348/135 |

FOREIGN PATENT DOCUMENTS

WO    WO2008/076942 A1    6/2008
WO    WO 2009/100728 A1    8/2009

* cited by examiner

*Primary Examiner* — Vu Le
*Assistant Examiner* — Aklilu Woldemariam
(74) *Attorney, Agent, or Firm* — Muncy, Geissler, Olds & Lowe, PLLC (57) ABSTRACT

A method and system for measuring three-dimensional coordinates of an object are provided. The method includes: capturing images from a calibration point of known three-dimensional coordinates by two image-capturing devices disposed in a non-parallel manner, so as for a processing module connected to the image-capturing devices to calculate a beam confluence collinear function of the image-capturing devices; calibrating the image-capturing devices to calculate intrinsic parameters and extrinsic parameters of the image-capturing devices and calculate the beam confluence collinear function corresponding to the image-capturing devices; and capturing images from a target object by the image-capturing devices so as for the processing module to calculate three-dimensional coordinates of the object according to the beam confluence collinear function. In so doing, the method and system enable the three-dimensional coordinates and bearings of a target object to be calculated quickly, precisely, and conveniently. Hence, the method and system are applicable to various operating environments.

19 Claims, 5 Drawing Sheets

METHOD AND SYSTEM FOR MEASURING OBJECT

BACKGROUND

1. Field of the Invention

The present invention relates to methods and systems for measuring objects, and, more particularly, to a method and system for measuring an object by two image-capturing devices not disposed in parallel but configured to calculate three-dimensional coordinates of the object using a beam confluence collinear function.

2. Description of the Prior Art

Due to rapid technological evolution, automation systems, such as robots and robotic arms, play an increasingly important role in the operation procedures of product design, industrial manufacturing, and high-precision operation. Hence, it is imperative to optimize automation systems. The key to optimization of automation systems lies in precise identification of three-dimensional coordinates of an object by automation systems, such as robots and robotic arms. In view of this, there are different methods for measuring three-dimensional coordinates of an object.

U.S. Pat. No. 6,795,200 discloses a method for measuring dimensions of objects, comprising the steps of projecting structured light on a plane under test and capturing images of an object on the plane under test by two cameras disposed in parallel. This patent has at least two drawbacks. In practice, users incur extra costs in providing the structured light. And, calculation of three-dimensional coordinates of an object by simple trigonometric geometric principles rarely takes account of errors arising from observation by a camera, and thus the calculated three-dimensional coordinates of the object are seldom precise. The imprecise calculated three-dimensional coordinates of the object bring about much greater errors in the follow-up operation of a system. Hence, U.S. Pat. No. 6,795,200 is not practical and is inapplicable to high-precision operation.

US20060088203 discloses a method for measuring an object, comprising the steps of mounting a plurality of fixed cameras, such as three, above a working area concurrently so as to capture three-dimensional images of an object within the working area and calculate three-dimensional coordinates of the object by simple trigonometric geometric principles. However, as disclosed in the application, the three fixed cameras mounted above the working area are pricey and inflexible in operation, not to mention that they prove useless in taking pictures of a hidden space and thus are inapplicable to high-precision operation.

WO2008076942 discloses a method for measuring an object, comprising the steps of: disposing a single video camera on a movable robotic arm for performing a plurality of multi-angle imaging operations on an object within a working area; and calculating three-dimensional coordinates of an object by simple trigonometric geometric principles. However, performing a plurality of multi-angle imaging operations on an object within a working area by a single video camera is time-consuming, cost-inefficient, and otherwise impractical. As with U.S. Pat. No. 6,795,200 and US20060088203, the three-dimensional coordinates of an object resulting from a follow-up calculation operation involving simple trigonometric geometric principles are plagued with relatively large errors and thus are not applicable to sophisticated operation.

In view of this, it is imperative to provide a method and system for measuring three-dimensional coordinates of an object conveniently, quickly, and precisely such that the method and system are applicable to sophisticated operation.

SUMMARY

In order to achieve the above and other objectives, the present invention provides a method for measuring an object, by first and second image-capturing devices disposed in a non-parallel manner and rotatable inwardly, and a processing module connected to the first and second image-capturing devices, the method comprising the steps of: (1) capturing a first image and a second image of at least a lens calibration point of known three-dimensional coordinates by the first image-capturing device and the second image-capturing device, respectively, followed by calculating, with a lens calibration algorithm, a first lens distortion parameter of the first image-capturing device and a second lens distortion parameter of the second image-capturing device according to the first image and the second image, respectively, by the processing module; (2) capturing image coordinates of a plurality of bearing calibration points of known three-dimensional coordinates by the first image-capturing device and the second image-capturing device likewise, followed by substituting the three-dimensional coordinates of the bearing calibration points, the first lens distortion parameter, and the second lens distortion parameter into a geometric function based on a beam confluence collinear imaging principle by the processing module, wherein the geometric function comprises an unknown first lens center and an unknown first bearing parameter of the first image-capturing device and an unknown second lens center and an unknown second bearing parameter of the second image-capturing device; and (3) performing computation on the geometric function with a preset algorithm so as to calculate the first lens center and the first bearing parameter of the first image-capturing device and the second lens center and the second bearing parameter of the second image-capturing device, followed by substituting the first lens center, the first bearing parameter, the second lens center, and the second bearing parameter thus calculated into the geometric function based on the beam confluence collinear imaging principle so as to generate a first beam confluence collinear function and a second beam confluence collinear function which correspond to the first and second image-capturing devices, all performed by the processing module.

In a preferred embodiment, the method further comprises a step (4) of capturing feature-point coordinates of a target object by the first image-capturing device and the second image-capturing device concurrently, and substituting the feature-point coordinates thus captured by the first image-capturing device and the feature-point coordinates thus captured by the second image-capturing device into the first and second beam confluence collinear functions, so as to calculate three-dimensional coordinates of the target object.

In another preferred embodiment, the geometric function based on the beam confluence collinear imaging principle in the step (2) satisfies $$x_c = -f\left[\frac{m_{11}(X_A - X_L) + m_{12}(Y_A - Y_L) + m_{13}(Z_A - Z_L)}{m_{31}(X_A - X_L) + m_{32}(Y_A - Y_L) + m_{33}(Z_A - Z_L)}\right]$$

$$y_c = -f\left[\frac{m_{21}(X_A - X_L) + m_{22}(Y_A - Y_L) + m_{23}(Z_A - Z_L)}{m_{31}(X_A - X_L) + m_{32}(Y_A - Y_L) + m_{33}(Z_A - Z_L)}\right]$$

which are expanded to become $$x_c = k_2\bar{x}^2 + (k_1 + 2k_2\bar{y}^2)\bar{x}^3 + (3p_1)\bar{x}^2 + (1 + k_0 + k_1\bar{y}^2 + k_2\bar{y}^4 + 2p_2\bar{y})\bar{x} + p_1\bar{y}^2$$

$$y_c = k_2\bar{y}^2 + (k_1 + 2k_2\bar{x}^2)\bar{y}^3 + (3p_2)\bar{y}^2 + (1 + k_0 + k_1\bar{x}^2 + k_2\bar{x}^4 + 2p_2\bar{x})\bar{y} + p_1\bar{x}^2$$

where $(X_A, Y_A, Z_A)$ denote known three-dimensional coordinates of the calibration point, $(x_c, y_c)$ denote coordinates of the image captured by the first or second image-capturing device from the bearing calibration points, f denotes a known focal length of the first or second image-capturing device, $k_0$, $k_1$, $k_2$, $p_1$, and $p_2$ denote the first and second lens distortion parameters, respectively, $(X_L, Y_L, Z_L)$ denote the first and second lens centers, $m_{11}$=cos $\phi$ cos $\kappa$, $m_{12}$=sin $\omega$ sin $\phi$ cos $\kappa$+cos $\omega$ sin $\kappa$, $m_{13}$=−cos $\omega$ sin $\phi$ cos $\kappa$+sin $\omega$ sin $\kappa$, $m_{21}$=−cos $\phi$ sin $\kappa$, $m_{22}$=−sin $\omega$ sin $\phi$ sin $\kappa$+cos $\omega$ cos $\kappa$, $m_{23}$=cos $\omega$ sin $\phi$ sin $\kappa$+sin $\omega$ cos $\kappa$, $m_{31}$=sin $\phi$, $m_{32}$=−sin $\omega$ cos $\phi$ and $m_{33}$=cos $\omega$ cos $\phi$, where $\omega$, $\phi$, $\kappa$ denote the first and second bearing parameters.

The present invention further provides a method for measuring an object, comprising the steps of: (1) capturing a first image and a second image of at least a calibration point of known three-dimensional coordinates by the first image-capturing device and the second image-capturing device, respectively; (2) substituting parameters attributable to the first image and the second image, respectively, and corresponding to the at least a calibration point of known three-dimensional coordinates into a geometric function based on a beam confluence collinear imaging principle, and performing computation on the geometric function with a preset algorithm, so as to calculate a first lens distortion parameter, a first lens center, and a first bearing parameter of the first image-capturing device, and a second lens distortion parameter, a second lens center, and a second bearing parameter of the second image-capturing device, by the processing module, and; (3) substituting the first lens distortion parameter, the first lens center, the first bearings parameter, the second lens distortion parameter, the second lens center, and the second bearings parameter all thus calculated into the geometric function based on the beam confluence collinear imaging principle, so as to generate a first beam confluence collinear function and a second beam confluence collinear function which correspond to the first and second image-capturing devices, respectively, by the processing module.

The present invention further provides a system for measuring an object, comprising: a first image-capturing device and a second image-capturing device not parallel thereto, the first and second image-capturing devices being configured to capture images of a target object and a calibration point; and a processing module connected to the first and second image-capturing devices for calibrating a lens and measuring an object according to the images captured from the calibration point by the first and second image-capturing devices, wherein the processing module substitutes parameters of the images captured from the calibration point into a geometric function based on a beam confluence collinear imaging principle so as to perform computation on the geometric function with a preset algorithm and thereby calculate a first lens distortion parameter, a first lens center, and a first bearings parameter of the first image-capturing device, and a second lens distortion parameter, a second lens center, and a second bearings parameter of the second image-capturing device, followed by capturing feature-point coordinates of the target object by the first image-capturing device and the second image-capturing device concurrently, and further followed by substituting the feature-point coordinates, the first lens distortion parameter, the first lens center, the first bearing parameter, the second lens distortion parameter, the second lens center, and the second bearing parameter thus captured by the first and second image-capturing devices into the geometric function based on the beam confluence collinear imaging principle so as to calculate three-dimensional coordinates of the target object.

In conclusion, the present invention uses two non-parallel image-capturing devices to capture images of an object and calculate beam confluence collinear functions of the image-capturing devices. Then, three-dimensional coordinates of an object are calculated, using the beam confluence collinear functions. Before capturing the images of the object, the image-capturing devices capture images from a calibration point of known three-dimensional coordinates, and lens calibration and bearings calibration are performed on the image-capturing devices according to the images captured from the calibration point of known three-dimensional coordinates, thereby enhancing the preciseness in the measuring of the three-dimensional coordinates of the object.

DETAILED DESCRIPTION OF THE EMBODIMENTS

The present invention is herein illustrated with specific embodiments, so that one skilled in the pertinent art can easily understand other advantages and effects of the present invention from the disclosure of the invention.

Figure 1A:
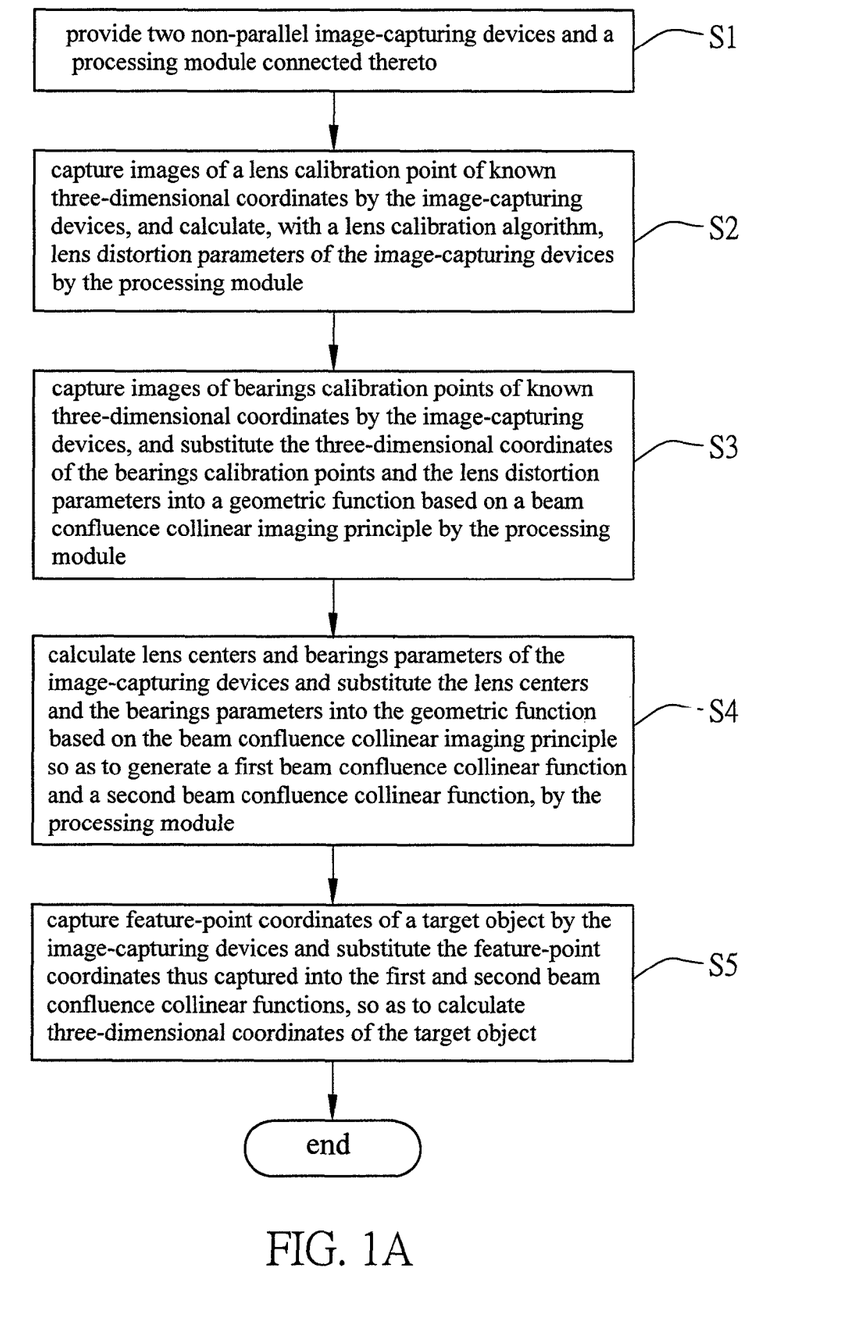
FIG. 1A is a flowchart of a method for measuring an object according to the present invention.
Figure 1B:
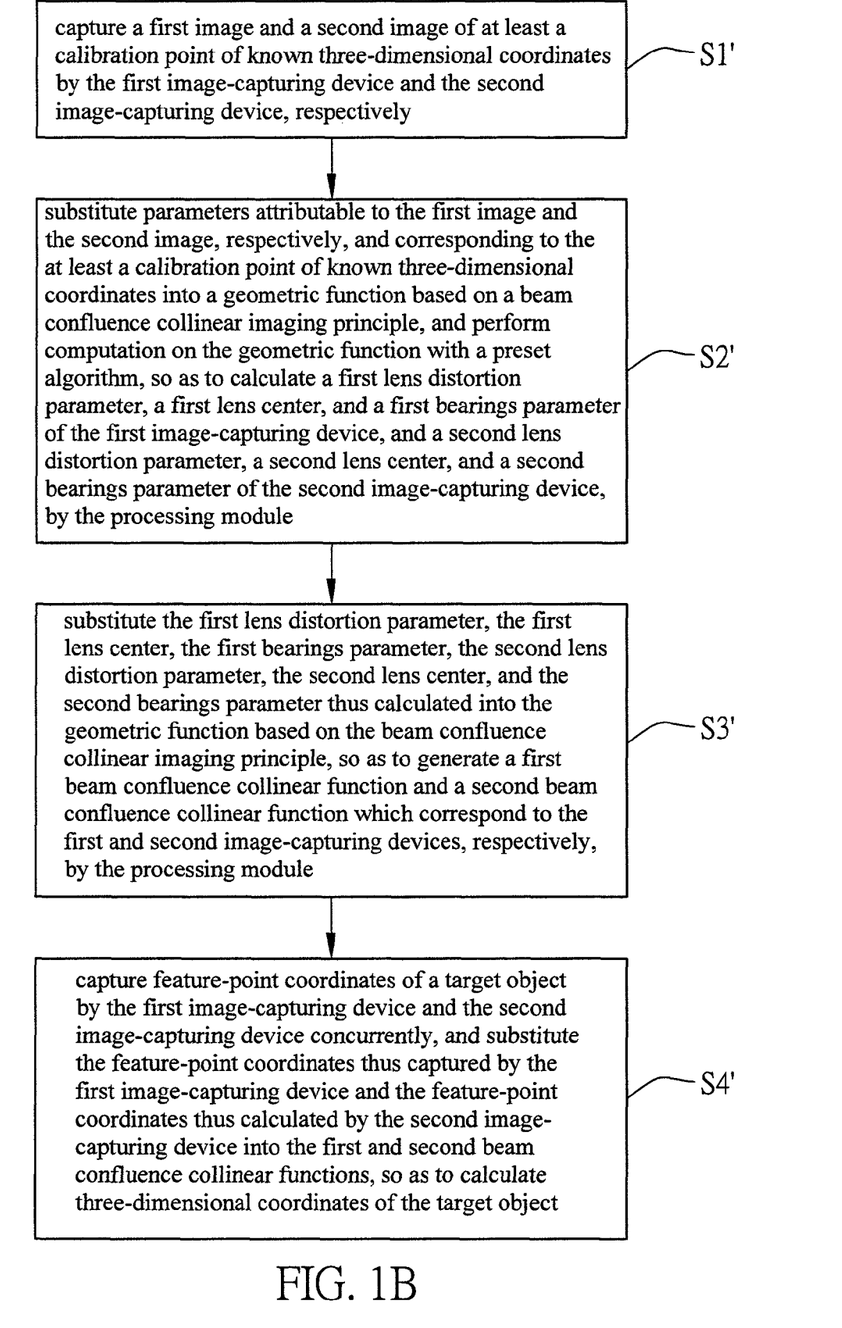
FIG. 1B is a flowchart of a method for measuring an object in another embodiment according to the present invention.
Figure 2:
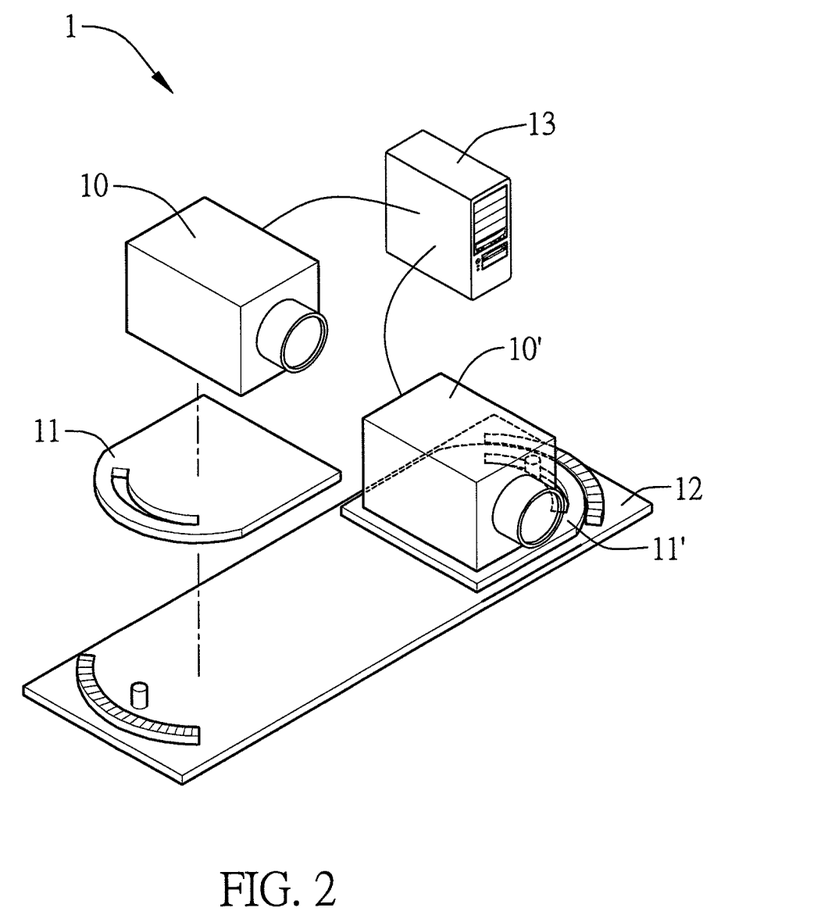
FIG. 2 is an exploded perspective view of a system for measuring an object according to the present invention.

Referring to FIG. 1A, FIG. 1B, there are shown flowcharts of a method for measuring an object according to the present invention. Referring to FIG. 2, there is shown an exploded perspective view of a system for measuring an object according to the present invention.

The steps shown in FIG. 1A are applicable to a system 1 for measuring an object as shown in FIG. 2. Referring to FIG. 2, the system 1 comprises at least an image-capturing device 10 and an image-capturing device 10', a rotating mechanism 11 and a rotating mechanism 11', a stationary base 12, and a processing module 13 connected to the image-capturing devices 10, 10'. The image-capturing devices 10, 10' are rotatable inward and disposed in a non-parallel manner.

In this embodiment, the image-capturing device 10 and the image-capturing device 10' are digital cameras or video cameras comprising a charge-coupled device (CCD), and are disposed on the rotating mechanism 11 and the rotating mechanism 11' which are movable and rotatable. The rotating mechanisms 11, 11' are rotatably and movably disposed on the stationary base 12. The stationary base 12 has graduations. The processing module 13 is a microprocessor or a computer capable of logical computation.

In step S1, the image-capturing device 10 and the image-capturing device 10' which are connected to the processing module 13 are rotatably disposed on the stationary base 12 by means of the rotating mechanism 11 and the rotating mechanism 11', and then the angle of rotation of the rotating mechanism 11 and the rotating mechanism 11' is adjusted according to three-dimensional coordinates of at least a calibration point, so as for the image-capturing device 10 and the image-capturing device 10' to be aligned with the calibration point and disposed on the stationary base 12 in a non-parallel manner.

In practice, the image-capturing device 10 and the image-capturing device 10' are spaced apart by a gap 10 cm wide or less, such as 5 cm, and the stationary base 12 is disposed on a robot or a robotic arm (not shown). The processing module 13 is built in. For example, the processing module 13 is disposed inside a robot or a robotic arm. The quantity of the image-capturing devices 10, 10' and the rotating mechanisms 11, 11' is subject to change as needed. The processing module 13 can be a simple data conversion device for transferring data acquired by the image-capturing device 10 and the image-capturing device 10' to an external computing unit (not shown) via an interface, such as USB, IEEE1394a, or IEEE1394b, to undergo follow-up computation.

In step S2, the image-capturing device 10 and the image-capturing device 10' capture a first image and a second image of at least a lens calibration point of known three-dimensional coordinates, respectively, and then the processing module 13 calculates, with a lens calibration algorithm, lens distortion parameters of the image-capturing device 10 and the image-capturing device 10' according to the first image and the second image, respectively. Then, proceed to step S3.

In this embodiment, the processing module 13 calculates the image coordinates of the lens calibration point from the first image and the second image and then uses a lens calibration algorithm, such as odd variation, to calculate the lens distortion parameters of the image-capturing device 10 and the image-capturing device 10' according to the image coordinates of the lens calibration point from the first image and the second image, respectively, and then turns the distortion curve of the lens image edge into a straight line by the lens distortion parameters thus calculated. The lens distortion parameters refer to radial distortion and cylindrical distortion of the lens of the image-capturing devices 10, 10'.

In step S3, the image-capturing device 10 and the image-capturing device 10' capture image coordinates of a plurality of bearing calibration points of known three-dimensional coordinates likewise, and then the processing module 13 substitutes three-dimensional coordinates of the bearing calibration points and the lens distortion parameters of the image-capturing device 10 and the image-capturing device 10' into a geometric function based on a beam confluence collinear imaging principle, wherein the geometric function comprises unknown lens centers and unknown bearing parameters of the image-capturing device 10 and the image-capturing device 10'. Then, proceed to step S4.

In this embodiment, the geometric function based on the beam confluence collinear imaging principle in step S2 satisfies $$x_c = -f\left[\frac{m_{11}(X_A - X_L) + m_{12}(Y_A - Y_L) + m_{13}(Z_A - Z_L)}{m_{31}(X_A - X_L) + m_{32}(Y_A - Y_L) + m_{33}(Z_A - Z_L)}\right]$$

$$y_c = -f\left[\frac{m_{21}(X_A - X_L) + m_{22}(Y_A - Y_L) + m_{23}(Z_A - Z_L)}{m_{31}(X_A - X_L) + m_{32}(Y_A - Y_L) + m_{33}(Z_A - Z_L)}\right]$$

which, by substitution of a lens distortion vector, can be expanded to become $$x_c = k_2\bar{x}^5 + (k_1 + 2k_2\bar{y}^2)\bar{x}^3 + (3p_1)\bar{x}^2 + (1+k_0+k_1\bar{y}^2+k_2\bar{y}^4+2p_2\bar{y})\bar{x} + p_1\bar{y}^2$$

$$y_c = k_2\bar{y}^5 + (k_1+2k_2\bar{x}^2)\bar{y}^3 + (3p_2)\bar{y}^2 + (1+k_0+k_1\bar{x}^2+k_2\bar{x}^4+2p_2\bar{x})\bar{y} + p_1\bar{x}^2$$

where $(X_A, Y_A, Z_A)$ denote known three-dimensional coordinates of the bearing calibration points, $(x_c, y_c)$ denote coordinates of the image captured by the image-capturing devices 10, 10' from the bearing calibration points, f denotes a known focal length of the image-capturing devices 10, 10', $k_0, k_1, k_2, p_1$, and $p_2$ denote the lens distortion parameters of the image-capturing devices 10, 10', respectively, and $(X_L, Y_L, Z_L)$ denote the lens centers of the image-capturing devices 10, 10'.

Furthermore, $m_{11}=\cos\phi\cos\kappa$, $m_{12}=\sin\omega\cos\kappa+\cos\omega\sin\kappa$, $m_{13}=-\cos\omega\sin\phi\cos\kappa+\sin\omega\sin\kappa$, $m_{21}=-\cos\phi\sin\kappa$, $m_{22}=-\sin\omega\sin\phi\sin\kappa+\cos\omega\cos\kappa$, $m_{23}=\cos\omega\sin\phi\sin\kappa+\sin\omega\cos\kappa$, $m_{31}=\sin\phi$, $m_{32}=-\sin\omega\cos\phi$ and $m_{33}=\cos\omega\cos\phi$, where $\omega, \phi, \kappa$ denote bearing parameters of the image-capturing devices 10, 10'.

In step S4, the processing module 13 uses a preset algorithm, such as value iteration or least squares approximation, to perform computation on the geometric function, so as for the lens centers and the bearing parameters of the image-capturing device 10 and the image-capturing device 10' to be calculated and substituted into a geometric function based on the beam confluence collinear imaging principle to thereby generate beam confluence collinear functions corresponding to the image-capturing device 10 and the image-capturing device 10'.

Figure 3:
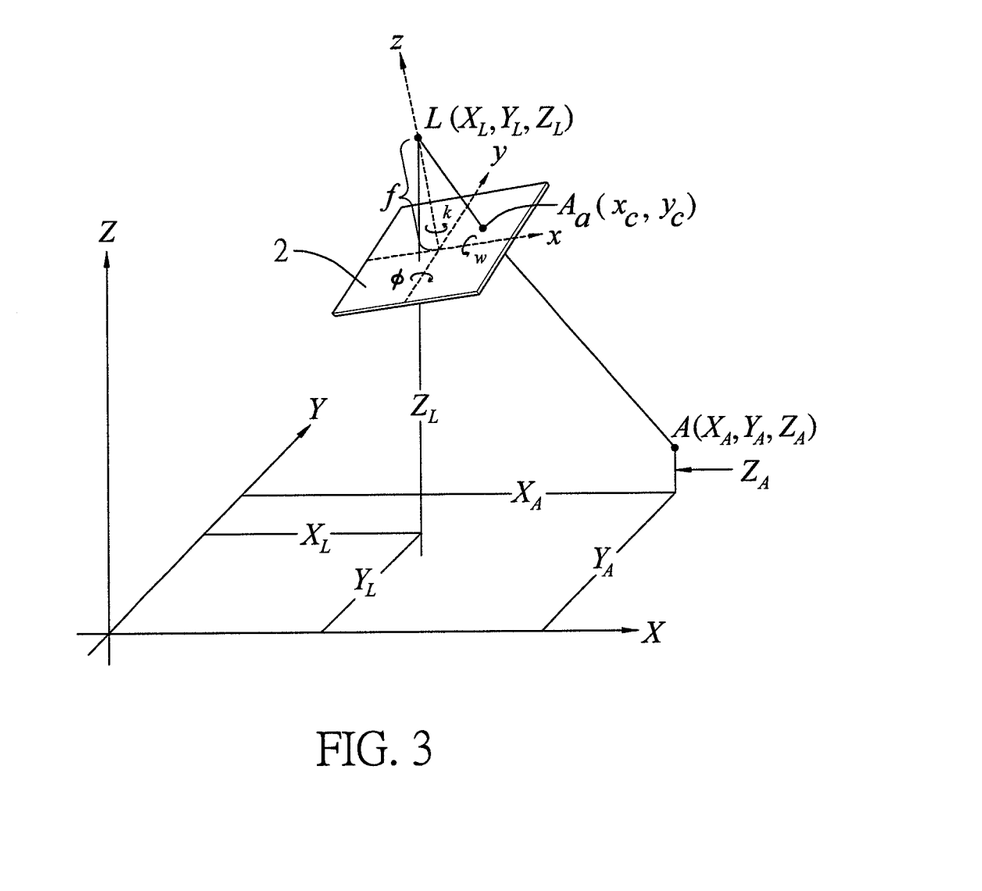
FIG. 3 is a three-dimensional graph illustrating beam confluence according to the present invention.

Referring to FIG. 3, in steps S2~S4, the method in an embodiment of the present invention is exemplified by the image-capturing device 10, so as to illustrate the three-dimensional positions of the image coordinates $A_a (x_c, x_c)$ of the calibration point A $(X_A, Y_A, Z_A)$ and the lens center L $(X_L, Y_L, Z_L)$ of the image-capturing device 10.

The image-capturing device 10 performs image capturing on the calibration point A $(X_A, Y_A, Z_A)$ to thereby capture an image screen 2 therefrom. The image screen 2 has the image coordinates $A_a (x_c, y_c)$ of the calibration point A $(X_A, Y_A, Z_A)$. The processing module 13 substitutes the coordinates of a plurality of said calibration points A $(X_A, Y_A, Z_A)$, a plurality of said image coordinates $A_a (x_c, y_c)$, and the focal length f of the image-capturing device 10 into the geometric function of the collinear imaging principle to thereby calculate the lens distortion parameters $k_0, k_1, k_2, p_1$, and $p_2$ of the image-capturing device 10 before finalizing lens calibration of the image-capturing device 10. The above-mentioned steps apply to lens calibration of the image-capturing device 10' as well. Lens calibration of the image-capturing device 10 and the image-capturing device 10' is synchronous or asynchronous as needed.

Afterward, A $(X_A, Y_A, Z_A)$ is seen as the bearings calibration point. The processing module 13 calculates the values of the bearing parameters $\omega, \phi, \kappa$ of the image-capturing device 10 and thereby performs bearings calibration on the image-capturing device 10 according to the calculated values of the bearing parameters $\omega, \phi, \kappa$, because $\omega, \phi, \kappa$ denote the angular displacement of the axes and the image-capturing device 10. Bearings calibration of the image-capturing device 10 and the image-capturing device 10' has to be synchronous.

At this point, the processing module 13 gets the lens center L $(X_L, Y_L, Z_L)$ of the image-capturing device 10. Afterward, the processing module 13 substitutes the coordinates of the lens center L $(X_L, Y_L, Z_L)$ of the image-capturing device 10 and the values of the bearing parameters $\omega, \phi, \kappa$ of the image-capturing device 10 into the geometric function based on the beam confluence collinear imaging principle, so as to generate the beam confluence collinear function corresponding to the image-capturing device 10. Likewise, the above-mentioned steps apply to generation of the beam confluence collinear function of the image-capturing device 10'.

In step S5, the image-capturing device 10 and the image-capturing device 10' capture feature-point coordinates of a target object concurrently, and then the processing module 13 substitutes the feature-point coordinates thus captured into the beam confluence collinear functions of the image-capturing device 10 and the image-capturing device 10', respectively, so as to calculate three-dimensional coordinates of the target object.

In this embodiment, the processing module 13 matches and performs similarity judgment on the feature-point coordinates thus captured by the image-capturing device 10 and the feature-point coordinates thus captured by the image-capturing device 10' so as to create an equation of the planes of the target object and calculate the three-dimensional coordinates and bearings of the target object with the equation of the planes.

In step S5, A $(X_A, Y_A, Z_A)$ denotes feature-point coordinates of a target object, and $A_a$ $(x_c, y_c)$ denotes image coordinates of the feature-point coordinates A $(X_A, Y_A, Z_A)$ of the target object. As mentioned earlier, L $(X_L, Y_L, Z_L)$ denotes the lens center of the image-capturing device 10.

As mentioned earlier, the image-capturing device 10 and the image-capturing device 10 perform image capturing on the calibration point A $(X_A, Y_A, Z_A)$ to thereby capture the image screen 2 therefrom. The image screen 2 manifests image coordinates $A_a$ $(x_c, y_c)$ of two said calibration points A $(X_A, Y_A, Z_A)$. The processing module substitutes the image coordinates $A_a$ $(x_c, y_c)$ of two said calibration points A $(X_A, Y_A, Z_A)$ into the beam confluence collinear functions of the image-capturing device 10 and the image-capturing device 10', respectively, so as to calculate A $(X_A, Y_A, Z_A)$ and three-dimensional coordinates of feature-point coordinates of the target object.

A calibration point or a target object has to fall within a visual field of overlap of the image-capturing device 10 and the image-capturing device 10', so as to precisely calculate three-dimensional coordinates and thereby enable three-dimensional vision. Hence, precise computation depends on the area of the visual field of overlap. Furthermore, the shorter the distance between a camera and the visual field of overlap of the image-capturing device and the image-capturing device 10', the less likely the short-distance defocus which might otherwise arise from a short distance between an object or a calibration point and the image-capturing devices 10, 10'. Hence, the image-capturing devices 10, 10' disposed in a non-parallel manner according to the present invention are applicable to sophisticated operation.

Figure 4A:
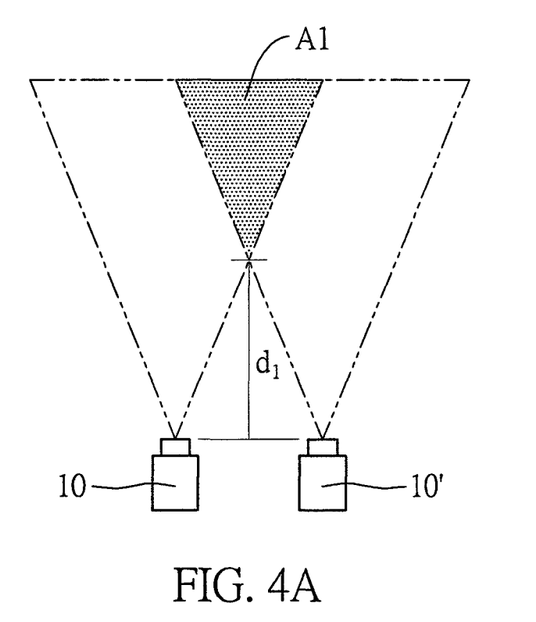
FIG. 4A is a top view of image-capturing devices disposed in a parallel manner according to the present invention.
Figure 4B:
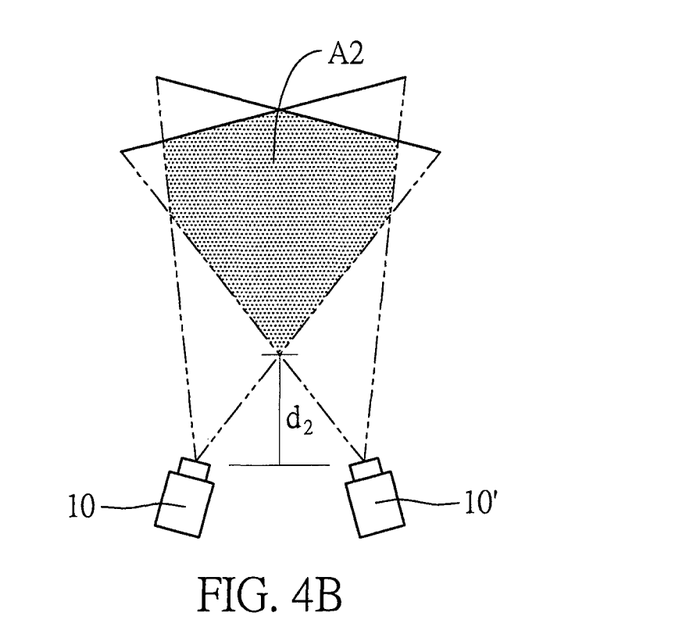
FIG. 4B is a top view of image-capturing devices disposed in a non-parallel manner according to the present invention.

Referring to FIG. 4A, shown is a top view of the image-capturing device 10 and the image-capturing device 10' parallel thereto according to the present invention. Referring to FIG. 4B, shown is a top view of the image-capturing device 10 and the image-capturing device 10' not parallel thereto according to the present invention. As shown in FIG. 4A, the image-capturing device 10 and the image-capturing device 10' which are disposed in a parallel manner together produce a visual field of overlap A1, and the visual field overlap A1 is separated from the image-capturing device 10 and the image-capturing device 10' by a distance d1. As shown in FIG. 4B, the image-capturing device 10 and the image-capturing device 10' which are disposed in a non-parallel manner together produce a visual field of overlap A2, and the visual field overlap A2 is separated from the image-capturing device 10 and the image-capturing device 10' by a distance d2. A comparison of FIG. 4A and FIG. 4B reveals that the visual field of overlap A2 is of a larger area than the visual field of overlap A1, and that the distance d1 is longer than the distance d2. Hence, the image-capturing device 10 and the image-capturing device 10' are most suitable for sophisticated operation when disposed in a non-parallel manner.

The following description refers to FIG. 1B again, for further illustration of the method for measuring an object in another embodiment according to the present invention.

In this embodiment, the method comprises the steps of: capturing a first image and a second image of at least a calibration point of known three-dimensional coordinates by the image-capturing device 10 and the image-capturing device 10', respectively (step S1'); substituting parameters attributable to the first image and the second image, respectively, and corresponding to the at least a calibration point of known three-dimensional coordinates into a geometric function based on a beam confluence collinear imaging principle, and performing computation on the geometric function with a preset algorithm, so as to calculate a first lens distortion parameter, a first lens center, and a first bearings parameter of the image-capturing device 10, and a second lens distortion parameter, a second lens center, and a second bearings parameter of the image-capturing device 10', by the processing module 13 (step S2'); and substituting the first lens distortion parameter, the first lens center, the first bearings parameter, the second lens distortion parameter, the second lens center, and the second bearings parameter thus calculated into the geometric function based on the beam confluence collinear imaging principle, so as to generate a first beam confluence collinear function and a second beam confluence collinear function which correspond to the image-capturing devices 10, 10', respectively, by the processing module 13 (step S3').

In this embodiment, step S4' involves capturing feature-point coordinates of a target object by the image-capturing device 10 and the image-capturing device 10' concurrently, and substituting the feature-point coordinates thus captured by the image-capturing device and the feature-point coordinates thus calculated by the image-capturing device 10' into the first and second beam confluence collinear functions, so as to calculate three-dimensional coordinates of the target object.

This embodiment differs from the previous embodiment in that, in this embodiment, calibration point images are captured only once (that is, the image-capturing device 10 and the image-capturing device 10' capture calibration point images for calibration in one and only one instance, though there can be a plurality of calibration points in the images), and the first lens distortion parameter, first bearing parameter, and first lens center of the image-capturing device 10 and the second lens distortion parameter, second bearing parameter, and second lens center of the image-capturing device 10' are synchronously calculated by the processing module 13.

By adjusting the angle of rotation of the image-capturing device 10 and the image-capturing device 10', it is feasible to replace lens calibration points and bearing calibration points in the previous embodiment with a single calibration point in this embodiment, and perform lens calibration and bearings calibration on the image-capturing device 10 and the image-capturing device 10' synchronously by the processing module 13. This embodiment has the same algorithm, parameters and function as the previous embodiment.

In conclusion, the present invention proposes using two non-parallel image-capturing devices to perform image capturing on a target object, calculating three-dimensional coordinates of the target object according to beam confluence collinear functions of the image-capturing devices, so as to calculate the three-dimensional coordinates of the target object conveniently, quickly, and precisely. Before capturing the images of an object, the image-capturing devices capture images from a calibration point of known three-dimensional coordinates, and lens calibration and bearings calibration are performed on the image-capturing devices according to the images captured from the calibration point of known three-dimensional coordinates, thereby enhancing the preciseness in the measuring of the three-dimensional coordinates of the object. Accordingly, the present invention obtains three-dimensional coordinates and bearings of a target object quickly and enhances the preciseness and ease in measuring the target object, and thus the present invention is applicable to various sophisticated working environments.

The foregoing descriptions of the detailed embodiments are provided to illustrate and disclose the features and functions of the present invention and are not intended to be restrictive of the scope of the present invention. It should be understood by those in the art that many modifications and variations can be made to the present invention and yet still fall within the scope of the spirit and principles of the disclosure of the present invention as set forth in the appended claims.

What is claimed is:

1. A method for measuring an object, by a first image-capturing device, a second image-capturing device not parallel thereto, and a processing module connected to the first and second image-capturing devices, the method comprising the steps of:
  (1) capturing a first image and a second image of at least a calibration point of known three-dimensional coordinates by the first image-capturing device and the second image-capturing device, respectively;
  (2) substituting parameters attributable to the first image and the second image, respectively, and corresponding to the at least a calibration point of known three-dimensional coordinates into a geometric function based on a beam confluence collinear imaging principle, and performing computation on the geometric function with a preset algorithm, so as to calculate a first lens distortion parameter, a first lens center, and a first bearings parameter of the first image-capturing device, and a second lens distortion parameter, a second lens center, and a second bearings parameter of the second image-capturing device, by the processing module, wherein the geometric function based on the beam confluence collinear imaging principle satisfies $$x_c = -f\left[\frac{m_{11}(X_A - X_L) + m_{12}(Y_A - Y_L) + m_{13}(Z_A - Z_L)}{m_{31}(X_A - X_L) + m_{32}(Y_A - Y_L) + m_{33}(Z_A - Z_L)}\right]$$

$$y_c = -f\left[\frac{m_{21}(X_A - X_L) + m_{22}(Y_A - Y_L) + m_{23}(Z_A - Z_L)}{m_{31}(X_A - X_L) + m_{32}(Y_A - Y_L) + m_{33}(Z_A - Z_L)}\right]$$

with $(X_A, Y_A, Z_A)$ denoting known three-dimensional coordinates of the calibration point $(x_c, y_c)$ denoting coordinates of the image captured by the first or second image-capturing device from the at least a calibration point, f denoting a known focal length of the first or second image-capturing device, $(X_1, Y_1, Z_1)$ denoting the first or second lens center, and $m_{11}, m_{12}, m_{13}, m_{21}, m_{22}, m_{23}, m_{31}, m_{32}$ and $m_{33}$ are parameters of the first or second image-capturing device, and;
  (3) substituting the first lens distortion parameter, the first lens center, the first bearings parameter, the second lens distortion parameter, the second lens center, and the second bearings parameter thus calculated into the geometric function based on the beam confluence collinear imaging principle, so as to generate a first beam confluence collinear function and a second beam confluence collinear function which correspond to the first and second image-capturing devices, respectively, by the processing module.

2. The method of claim 1, further comprising a step (4) of capturing feature-point coordinates of a target object by the first image-capturing device and the second image-capturing device concurrently, and substituting the feature-point coordinates thus captured by the first image-capturing device and the feature-point coordinates thus calculated by the second image-capturing device into the first and second beam confluence collinear functions, so as to calculate three-dimensional coordinates of the target object.

3. The method of claim 2, wherein the step (4) further comprises matching and performing similarity judgment on the feature-point coordinates thus captured by the first image-capturing device and the feature-point coordinates thus captured by the second image-capturing device so as to create an equation of planes of the target object and calculate the three-dimensional coordinates and bearings of the target object with the equation of planes.

4. The method of claim 1, wherein the preset algorithm in the step (2) is configured to turn a lens image edge distortion curve into a straight line by odd variation and exemplified by value iteration.

5. The method of claim 1, wherein the geometric function based on the beam confluence collinear imaging principle in the step (2) satisfies $$x_c = -f\left[\frac{m_{11}(X_A - X_L) + m_{12}(Y_A - Y_L) + m_{13}(Z_A - Z_L)}{m_{31}(X_A - X_L) + m_{32}(Y_A - Y_L) + m_{33}(Z_A - Z_L)}\right]$$

$$y_c = -f\left[\frac{m_{21}(X_A - X_L) + m_{22}(Y_A - Y_L) + m_{23}(Z_A - Z_L)}{m_{31}(X_A - X_L) + m_{32}(Y_A - Y_L) + m_{33}(Z_A - Z_L)}\right]$$

which are expanded to become $$x_c = k_2\bar{x}^5 + (k_1 + 2k_2\bar{y}^2)\bar{x}^3 + (3p_1)\bar{x}^2 + (1 + k_0 + k_1\bar{y}^2 + k_2\bar{y}^4) + 2p_2\bar{y})\bar{x} + p_1\bar{y}^2$$

$$y_c = k_2\bar{y}^5 + (k_1 + 2k_2\bar{x}^2)\bar{y}^3 + (3p_2)\bar{y}^2 + (1 + k_0 + k_1\bar{x}^2 + k_2\bar{x}^4) + 2p_2\bar{x})\bar{y} + p_1\bar{x}^2$$

with $k_0, k_1, k_2, p_1$, and $p_2$ denoting the first and second lens distortion parameter, respectively, and $m_{11}=\cos\phi\cos\kappa$, $m_{12}=\sin\omega\sin\phi\cos\kappa+\cos\omega\sin\kappa$, $m_{13}=-\cos\omega\sin\phi\cos\kappa+\sin\omega\sin\kappa$, $m_{21}=-\cos\phi\sin\kappa$, $m_{22}=-\sin\omega\sin\phi\sin\kappa+\cos\omega\cos\kappa$, $m_{23}=\cos\omega\sin\phi\sin\kappa+\sin\omega\cos\kappa$, $m_{31}=\sin\phi$, $m_{32}=-\sin\omega\cos\phi$ and $m_{33}=\cos\omega\cos\phi$, where $\omega, \phi, \kappa$ denote the first or second bearings parameter.

6. The method of claim 1, wherein the first or second lens distortion parameter refers to radial distortion and cylindrical distortion of the lens of the first or second image-capturing device.

7. A method for measuring an object, by a first image-capturing device, a second image-capturing device not parallel thereto, and a processing module connected to the first and second image-capturing devices, the method comprising the steps of:
  (1) capturing a first image and a second image of at least a lens calibration point of known three-dimensional coordinates by the first image-capturing device and the second image capturing device, respectively, followed by calculating, with a lens calibration algorithm, a first lens distortion parameter of the first image-capturing device and a second lens distortion parameter of the second image-capturing device according to the first image and the second image, respectively, by the processing module;

(2) capturing image coordinates of a plurality of bearing calibration points of known three-dimensional coordinates by the first image-capturing device and the second image-capturing device likewise, followed by substituting the three-dimensional coordinates of the bearing calibration points, the first lens distortion parameter, and the second lens distortion parameter into a geometric function based on a beam confluence collinear imaging principle by the processing module, wherein the geometric function comprises an unknown first lens center and an unknown first bearings parameter of the first image-capturing device and an unknown second lens center and an unknown second bearings parameter of the second image-capturing device, wherein the geometric function based on the beam confluence collinear imaging principle satisfies $$x_c = -f\left[\frac{m_{11}(X_A - X_L) + m_{12}(Y_A - Y_L) + m_{13}(Z_A - Z_L)}{m_{31}(X_A - X_L) + m_{32}(Y_A - Y_L) + m_{33}(Z_A - Z_L)}\right]$$

$$y_c = -f\left[\frac{m_{21}(X_A - X_L) + m_{22}(Y_A - Y_L) + m_{23}(Z_A - Z_L)}{m_{31}(X_A - X_L) + m_{32}(Y_A - Y_L) + m_{33}(Z_A - Z_L)}\right]$$

with $(X_A, Y_A, Z_A)$ denoting known three-dimensional coordinates of the calibration point $(x_c, y_c)$ denoting coordinates of the image captured by the first or second image-capturing device from the at least a calibration point, f denoting a known focal length of the first or second image-capturing device, $(X_1, Y_1, Z_1)$ denoting the first or second lens center and $m_{11}$, $m_{12}$, $m_{13}$, $m_{21}$, $m_{22}$, $m_{23}$, $m_{31}$, $m_{32}$ and $m_{33}$ are parameters of the first or second image-capturing device, and;

(3) performing computation on the geometric function with a preset algorithm so as to calculate the first lens center and the first bearings parameter of the first image-capturing device and the second lens center and the second bearings parameter of the second image-capturing device, followed by substituting the first lens center, the first bearings parameter, the second lens center, and the second bearings parameter thus calculated into the geometric function based on the beam confluence collinear imaging principle so as to generate a first beam confluence collinear function and a second beam confluence collinear function which correspond to the first and second image-capturing devices, by the processing module.

8. The method of claim 7, further comprising the step (4) of capturing feature-point coordinates of a target object by the first image-capturing device and the second image-capturing device concurrently, and substituting the feature-point coordinates thus captured by the first image-capturing device and the feature-point coordinates thus captured by the second image-capturing device into the first and second beam confluence collinear functions, so as to calculate three-dimensional coordinates of the target object.

9. The method of claim 8, wherein the step (4) further comprises matching and performing similarity judgment on the feature-point coordinates thus captured by the first image-capturing device and the feature-point coordinates thus captured by the second image-capturing device so as to create an equation of planes of the target object and calculate the three-dimensional coordinates and bearings of the target object with the equation of planes.

10. The method of claim 7, wherein the lens calibration algorithm in the step (1) is configured to turn a lens image edge distortion curve into a straight line by odd variation.

11. The method of claim 7, wherein the geometric function based on the beam confluence collinear imaging principle in the step (2) satisfies $$x_c = -f\left[\frac{m_{11}(X_A - X_L) + m_{12}(Y_A - Y_L) + m_{13}(Z_A - Z_L)}{m_{31}(X_A - X_L) + m_{32}(Y_A - Y_L) + m_{33}(Z_A - Z_L)}\right]$$

$$y_c = -f\left[\frac{m_{21}(X_A - X_L) + m_{22}(Y_A - Y_L) + m_{23}(Z_A - Z_L)}{m_{31}(X_A - X_L) + m_{32}(Y_A - Y_L) + m_{33}(Z_A - Z_L)}\right]$$

which are expanded to become $$x_c = k_2\bar{x}^5 + (k_1 + 2k_2\bar{y}^2)\bar{x}^3 + (3p_1)\bar{x}^2 + (1 + k_0 + k_1\bar{y}^2 + k_2\bar{y}^4) + 2p_2\bar{y})\bar{x} + p_1\bar{y}^2$$

$$y_c = k_2\bar{y}^5 + (k_1 + 2k_2\bar{x}^2)\bar{y}^3 + (3p_2)\bar{y}^2 + (1 + k_0 + k_1\bar{x}^2 + k_2\bar{x}^4) + 2p_2\bar{x})\bar{y} + p_1\bar{x}^2$$

with $k_0$, $k_1$, $k_2$, $p_1$, and $p_2$ denoting the first and second lens distortion parameter, respectively, and $m_{11}$=cos φ cos κ, $m_{12}$=sin ω sin φ cos κ+cos ω sin κ, $m_{13}$=−cos ω sin φ cos κ+sin ω sin κ, $m_{21}$=−cos φ sin κ, $m_{22}$=−sin ω sin φ sin κ+cos ω cos κ, $m_{23}$=cos ω sin φ sin κ+sin ω cos κ, $m_{31}$=sin φ, $m_{32}$=−sin ω cos φ and $m_{33}$=cos ω cos φ, where ω, φ, κ denote the first or second bearings parameter.

12. The method of claim 7, wherein the preset algorithm in the step (3) is value iteration.

13. The method of claim 7, wherein the first or second lens distortion parameter refer to radial distortion and cylindrical distortion of the lens of the first or second image-capturing device.

14. A system for measuring an object, comprising:
a first image-capturing device and a second image-capturing device not parallel thereto, the first and second image-capturing devices being configured to capture images of a target object and a calibration point;
a processing module connected to the first and second image-capturing devices for calibrating a lens and measuring an object according to the images captured from the calibration point by the first and second image-capturing devices, wherein the processing module substitutes parameters of the images captured from the calibration point into a geometric function based on a beam confluence collinear imaging principle so as to perform computation on the geometric function with a preset algorithm and thereby calculate a first lens distortion parameter, a first lens center, and a first bearings parameter of the first image-capturing device and a second lens distortion parameter, a second lens center, and a second bearings parameter of the second image capturing device, followed by capturing feature-point coordinates of the target object by the first image-capturing device and the second image-capturing device concurrently, and further followed by substituting the feature-point coordinates, the first lens distortion parameter, the first lens center, the first bearings parameter, the second lens distortion parameter, the second lens center, and the second bearings parameter thus captured by the first and second image-capturing devices into the geometric function based on the beam confluence collinear imaging principle so as to calculate three-dimensional coordinates of the target object;
a first rotating mechanism for connection with the first image-capturing device;

a second rotating mechanism for connection with the second image-capturing device; and a stationary base for connection with the first and second rotating mechanisms, wherein the first and second rotating mechanisms are movably disposed on the stationary base and configured to adjust an angle of rotation of the first and second rotating mechanisms according to three-dimensional coordinates of the target object and/or the calibrating point, so as for the first and second image-capturing devices to be disposed on the stationary base in a non-parallel manner.

15. The system of claim 14, wherein the rotating mechanisms are disposed on the stationary base in an alternate manner so as for a gap to be provided between the first and second image-capturing devices disposed in a non-parallel manner.

16. The system of claim 15, wherein the gap is 10 cm wide or less.

17. The system of claim 14, wherein the calibrating of the lens refers to calculating a first lens distortion parameter of the first image-capturing device and a second lens distortion parameter of the second image-capturing device by the processing module, and the calibrating of bearings refers to calculating the first bearings parameter of the first image capturing device and the second bearings parameter of the second image-capturing device by the processing module.

18. The system of claim 14, wherein the first or second image-capturing device is a camera or a video camera comprising a charge-coupled device.

19. The system of claim 14, wherein the processing module is a microprocessor or a computer capable of logical computation.

* * * * *